United States Patent [19]

Begun et al.

[11] Patent Number: 5,327,545
[45] Date of Patent: * Jul. 5, 1994

[54] DATA PROCESSING APPARATUS FOR SELECTIVELY POSTING WRITE CYCLES USING THE 82385 CACHE CONTROLLER

[75] Inventors: Ralph M. Begun, Boca Raton; Patrick M. Bland; Mark E. Dean, both of Delray Beach, all of Fla.

[73] Assignee: International Business Machines Corporation, Armonk, N.Y.

[*] Notice: The portion of the term of this patent subsequent to Sep. 3, 2008 has been disclaimed.

[21] Appl. No.: 696,809

[22] Filed: May 7, 1991

Related U.S. Application Data

[63] Continuation of Ser. No. 359,794, Jun. 1, 1989, Pat. No. 5,045,998, which is a continuation-in-part of Ser. No. 198,893, May 26, 1988, abandoned.

[51] Int. Cl.$^5$ ............................................. G06F 12/00
[52] U.S. Cl. ................................... 395/425; 364/221; 364/230.3; 364/DIG. 1
[58] Field of Search ............... 395/425, 500, 400, 325; 395/375, 200, 800

[56] References Cited

U.S. PATENT DOCUMENTS

| | | | |
|---|---|---|---|
| 4,016,541 | 4/1977 | Delagi et al. | 340/172.5 |
| 4,257,095 | 3/1981 | Nadir et al. | 364/200 |
| 4,314,334 | 2/1982 | Daughton et al. | 364/200 |
| 4,358,823 | 11/1982 | McDonald | 395/575 |
| 4,371,754 | 2/1983 | De | 371/9.1 |
| 4,466,098 | 8/1984 | Southard | 371/9.1 |
| 4,649,476 | 3/1987 | Sibigtroth | 364/200 |
| 4,853,846 | 8/1989 | Johnson et al. | 364/200 |
| 5,210,843 | 5/1993 | Ayers | 395/425 |

OTHER PUBLICATIONS

B. C. Cole, How A Cache Control Chip Supercharges 386 Processor, Electronics vol. 60, No. 12, Jun. 11, 1987, pp. 74-76.
D. Jones et al., The 68030; Electronics & Wireless World vol. 93, No. 1621, Nov. 1987, pp. 1121-1123.

*Primary Examiner*—Paul V. Kulik
*Assistant Examiner*—Jennifer M. Orzech
*Attorney, Agent, or Firm*—Michael J. Buchenhorner

[57] ABSTRACT

A microcomputer system employing an 80386 CPU and an 82385 cache controller has the capability of functioning with dynamic bus sizing (where the CPU interacts with devices which may or may not be 32-bits wide), as well as posted write capability. Unfortunately, the two capabilities have the possibility of an incompatibility if a write cycle is posted to a device which cannot transfer 32 bits on a single cycle. The present invention provides logic to overcome this incompatibility. An address decoder is provided to decode the tag portion of an address asserted on a CPU local bus to determine if the asserted address is inside or outside a range of addresses which define cacheable devices. Any cacheable device is by definition 32 bits wide and therefore posted writes are allowed only to cacheable devices. Accordingly, the microcomputer system employing the invention posts write cycles to cacheable devices; write cycles to non-cacheable devices are inhibited from being posted.

7 Claims, 4 Drawing Sheets

FIG. 4

DATA PROCESSING APPARATUS FOR SELECTIVELY POSTING WRITE CYCLES USING THE 82385 CACHE CONTROLLER

This is a continuation of copending application(s) Ser. No. 07/359,794 filed on 1 Jun. 1989, now U.S. Pat. No. 5,045,998 which copending application is a continuation-in-part of application Ser. No. 07/198,893 filed on 26 May 1988, now abandoned.

TECHNICAL FIELD

The present invention relates to microcomputer systems, particularly microcomputer systems employing a cache subsystem and an 82385 cache controller which includes apparatus to selectively post write cycles.

BACKGROUND ART

The use of cache subsystems in microcomputer systems leads to a number of attractive operating advantages. A microcomputer system employing a cache subsystem is in effect a dual bus microcomputer. The CPU and cache subsystem are connected together via what can be referred to as a CPU local bus. Separate from the CPU local bus is a system bus to which other devices (I/O devices, additional memory, etc.) can be connected. The presence of the cache subsystem relieves the system bus from any read memory access to the extent that the information sought is found in the cache subsystem. Because not all desired information will be found in the cache subsystem, and write operations are usually directed to both the cache subsystem and to memory, there must of course be some connection between the system bus and the CPU local bus. When that connection is a latched buffer, additional advantages, specifically posted write operations, are possible.

More particularly, in any write operation, access will be necessary to memory (which is not on the CPU local bus). The information (data and address) for the write access is initially placed on the CPU local bus where it can be used for writing to the cache subsystem. Since the interface between the CPU local bus and the system bus is a latched buffer, the same data can be latched into the buffer. Once that information is latched onto the buffer, it need no longer be driven by the CPU. Thus a posted write cycle relies on the fact that the address and data information for a memory write operation is available from the latched buffer. Completion of that write cycle does not require the attention of the CPU. Thus in a "posted" write, the data and address for the write cycle is latched into the buffer interfacing the CPU local bus and system bus whereafter the CPU can go on to initiate a subsequent cycle. The cache control system (including the cache controller) can then monitor completion of the write to memory.

Microcomputer systems comprising an 80386 processor and an 82385 cache controller are arranged to take advantage of posted write operations in exactly this fashion.

The 80386, and the signals it generates, are described in "Introduction to the 80386 Including the 80386 Data Sheet" from Intel (April 1986). The 82385 cache controller, and the signals it generates, are described in "82385 High Performance 32-Bit Cache Controller", available from Intel (July 1987).

Another attractive feature of the 80386 is its capability for operating with what is referred to as dynamic bus sizing. The 80386 is nominally a 32-bit machine, i.e. its data bus is 32 bits wide. Dynamic bus sizing refers to the capability of the 80386 processor to cooperate with not only 32-bit devices (memory, I/O, etc.) but with devices which do not have 32-bit capability, i.e. devices that cannot transfer 32 bits of data in a single cycle. There are for example a wide variety of memory and/or I/O devices which are 16-bit devices, i.e. they can transfer no more than 16 bits of data on a given cycle. Moreover, there are 8-bit I/O, memory and other devices. Such devices can transfer only eight bits of data on a given cycle.

The 80386 includes provision for a BS16 signal. When that signal is asserted, it has the following effect. In the event the 80386 has generated a 32-bit cycle, i.e. it has generated and/or expects to accept 32 bits of data, the assertion of the BS16 signal indicates to the 80386 that it is not operating with a 32-bit device. Assertion of the BS16 signal will, during the 32-bit cycle, automatically initiate the generation of a second cycle. By convention, any 16-bit device is arranged to transfer a predetermined group of 16 bits from the 32-bit data bus. The 80386, on the second cycle generated by the presence of the BS16 signal will place that group of 16 data bits which in the first cycle was not in the predetermined group of data bits onto a predetermined group of data lines which is associated with the predetermined group of 16 bits. Accordingly, in the first of the two cycles, the 16-bit device will transfer a given set of 16 bits of the 32 bits data space. In the second cycle, the 16-bit device will transfer another 16 bits of data so that, taken together, the two 16-bit cycles transfer 32 bits.

There is, however, an incompatibility between posted write cycles and dynamic bus sizing. That incompatibility arises for the following reason. Assume that the 80386 initiates a posted write. The data and address for the posted write cycle are latched into the buffered interface between the CPU local bus and the system bus. Although the write cycle is not yet completed, a ready signal is returned to the 80386. This simulates completion of the cycle so that the 80386 can initiate a following operation. Since the BS16 signal (which is returned to the 80386 to indicate the size of the device with which it is operating) is generated by the device, that signal is not generated until the device has recognized its address. Continuing with the example, and assuming that the device for which the posted write cycle is destined is in fact a 16-bit device, by the time the BS16 signal is returned to the 80386, it has already gone beyond the given operation and is engaged in the following operation. The 80386 therefore cannot generate the second, necessary cycle for the 16-bit device.

Therefore it is an object of the invention to selectively post write cycles. Since a posted write cycle is identified with an early generation of a ready signal to the 80386, the invention provides logic to generate the ready signal to the 80386 only when a posted write is appropriate. In accordance with the invention, all devices with which the 80386 can interact (I/O, memory, etc.) are classified as either cacheable devices or non-cacheable devices. The address assigned to all the devices has a tag which indicates whether the device is cacheable or non-cacheable. In accordance with the invention, an address decoder is provided on the CPU local bus. The address decoder responds to the asserted address on the CPU local bus to assert a NCA signal when the access is to a non-cacheable device.

82385 High Performance 32-Bit Cache Controller provides, at Section 1.3.3 that:

"Non-cacheable cycles fall into one of two categories: cycles decoded as non-cacheable, and cycles that are by default non-cacheable according to the 82385's design. All non-cacheable cycles are forwarded to the 82385 local bus. Non-cacheable cycles have no effect on the cache or cache directory.

"The 82385 allows the system designer to define areas of main memory as non-cacheable. The 80386 address bus is decoded and the decode output is connected to the 82385's non-cacheable access (NCA#) input. This decoding is done in the first 80386 bus state in which the non-cacheable cycle address becomes available. Non-cacheable read cycles resemble cacheable read miscycles, except that the cache and cache directory are uneffected. Non-cacheable writes, like all writes, are posted."

And under Section 3.3.2, the document indicates:

"NCA# allows the designer to set aside a portion of main memory as non-cacheable. Potential applications include memory-mapped I/O and systems where multiple masters access dual ported memory via different buses."

Furthermore, while the 82385 cache controller is arranged to generate the ready signal, that signal is not coupled to the 80386. Rather, that signal is coupled to logic means in accordance with the present invention. That logic means, depending upon a variety of other asserted signals, will generate a CPUREADY signal (to replace the ready signal) only when appropriate. More particularly, the logic means of the present invention generates the CPUREADY signal to allow posted write cycles only when the access is to a cacheable device, i.e. in the absence of the NCA signal. On the other hand, in the presence of the NCA signal, the logic means withholds generation of the CPUREADY signal so that in effect posted write operations do not occur.

Accordingly, in accordance with one feature, the invention provides a microcomputer system having:

a CPU local bus connecting a CPU and a cache subsystem, said CPU having means for posted write operations in response to receipt of a CPU ready signal prior to completion of a write operation, system bus means connecting a random access memory and a plurality of addressable functional units, said system bus means returning a ready signal at completion of a write operation, means for bidirectionally coupling said system bus and said CPU local bus, and logic means for selectively preventing posted write operations, said logic means comprising:

a) address decoder means coupled to an address bus component of said CPU local bus for generating a NCA signal indicating assertion of an address on said CPU local bus outside an address range associated with said cache subsystem, and b) means responsive to said NCA signal for withholding said CPU ready signal until receipt of said unit ready signal from one of said addressable functional units.

DETAILED DESCRIPTION OF A PREFERRED EMBODIMENT

Figure 1:
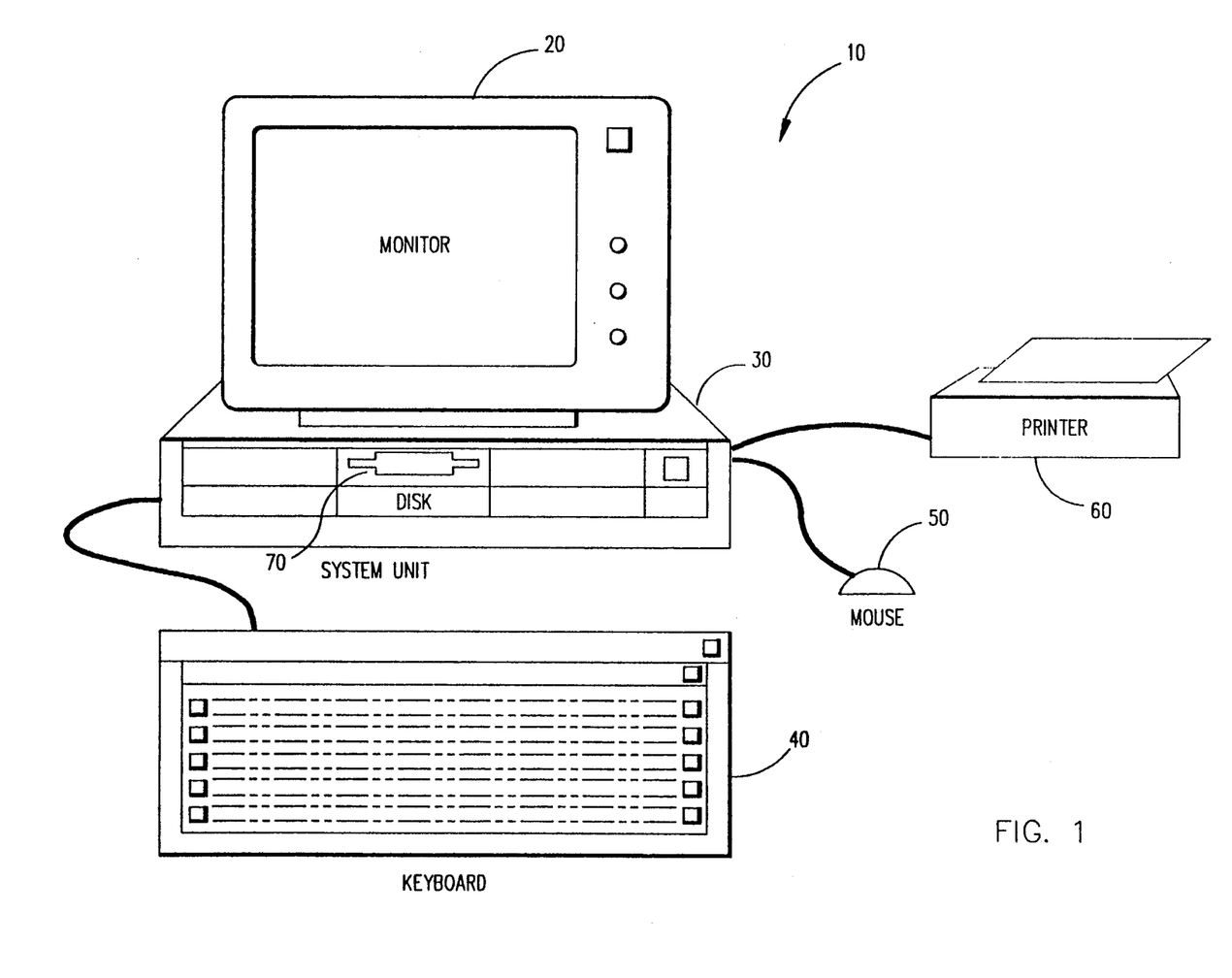
FIG. 1 is an overall three-dimensional view of a typical microcomputer system employing the present invention.

FIG. 1 shows a typical microcomputer system in which the present invention can be employed. As shown, the microcomputer system 10 comprises a number of components which are interconnected together. More particularly, a system unit 30 is coupled to and drives a monitor 20 (such as a conventional video display). The system unit 30 is also coupled to input devices such as a keyboard 40 and a mouse 50.

An output device such as a printer 60 can also be connected to the system unit 30. Finally, the system unit 30 may include one or more disk drives, such as the disk drive 70. As will be described below, the system unit 30 responds to input devices such as the keyboard 40 and the mouse 50, and input/output devices such as the disk drive 70 for providing signals to drive output devices such as the monitor 20 and the printer 60. Of course, those skilled in the art are aware that other and conventional components can also be connected to the system unit 30 for interaction therewith. In accordance with the present invention, the microcomputer system 10 includes (as will be more particularly described below) a cache memory subsystem such that there is a CPU local bus interconnecting a processor, a cache control and a cache memory which CPU local bus is coupled via a buffer to a system bus. The system bus is interconnected to and interacts with the I/O devices such as the keyboard 40, mouse 50, disk drive 70, monitor 20 and printer 60. Furthermore, in accordance with the present invention, the system unit 30 may also include a third bus comprising a Micro Channel (TM) bus for interconnection between the system bus and other (optional) input/output devices.

Figure 2:
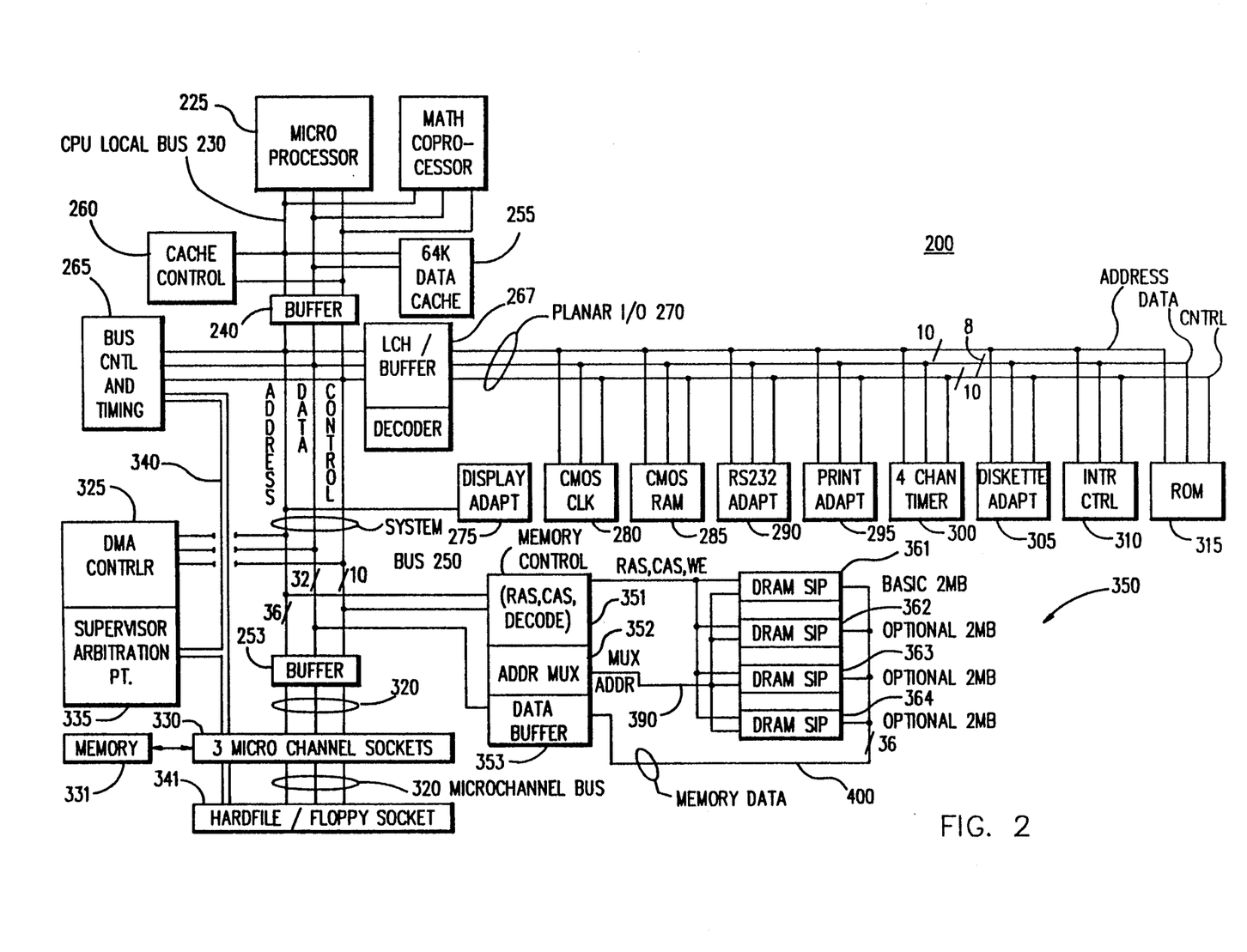
FIG. 2 is a detailed block diagram of a majority of the components of a typical microcomputer system employing the present invention.

FIG. 2 is a high level block diagram illustrating the various components of a typical microcomputer system in accordance with the present invention. A CPU local bus 230 (comprising data, address and control components) provides for the connection of a microprocessor 225 (such as an 80386), a cache control 260 (which may include an 82385 cache controller) and a random access cache memory 255. Also coupled on the CPU local bus 230 is a buffer 240. The buffer 240 is itself connected to the system bus 250, also comprising address, data and control components. The system bus 250 extends between the buffer 240 and a further buffer 253.

The system bus 250 is also connected to a bus control and timing element 265 and a DMA controller 325. An arbitration control bus 340 couples the bus control and timing element 265 and an arbitration supervisor 335.

Main memory 350 is also connected to the system bus 250. The main memory includes a memory control element 351, an address multiplexer 352 and a data buffer 353. These elements are interconnected with memory elements 360 through 364, as shown in FIG. 2. Memory devices and cacheable memory devices may be coupled to the bus 320; a typical memory device 331 is shown in FIG. 2.

A further buffer 254 is coupled between the system bus 250 and a planar bus 270. The planar bus 270 includes address data and control components, respectively. Coupled along the planar bus 270 are a variety of I/O adaptors and other components such as the display adaptor 275 (which is used to drive the monitor 20), a clock 280, additional random access memory 285, an RS 232 adaptor 290 (used for serial I/O operations), a printer adaptor 295 (which can be used to drive the printer 60), a timer 300, a diskette adaptor 305 (which cooperates with the disk drive 70), an interrupt controller 310 and read only memory 315. A further buffer 253 is coupled between the system bus 250 and a further bus, such as a Micro-Channel (TM) 320 bus used for connection of optional functional units.

Figure 3:
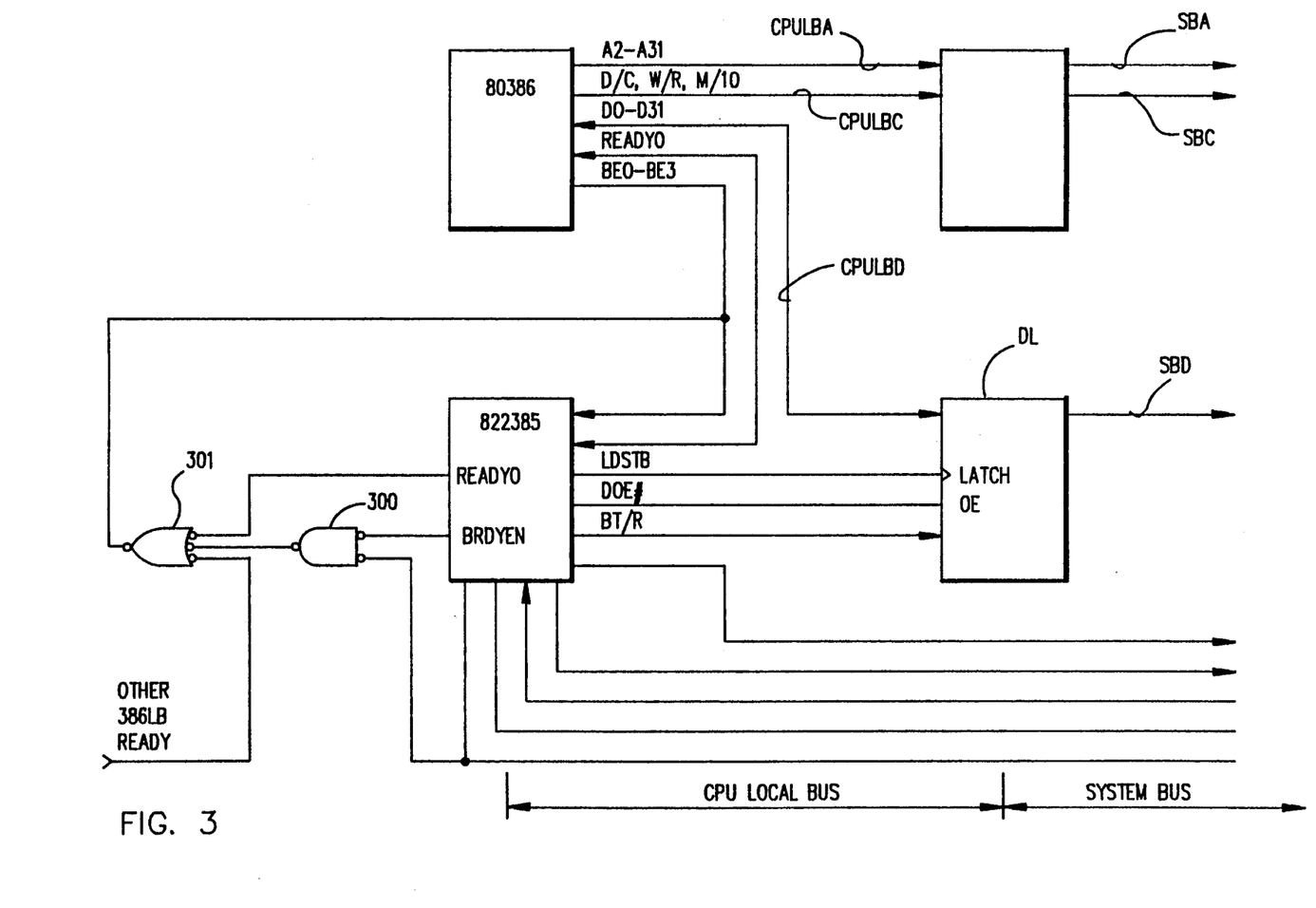
FIG. 3 is a block diagram, in somewhat more detail than FIG. 2, showing those connections between an 80386 and 82385 recommended by the manufacturer and which is useful to an understanding of why such an arrangement is inconsistent with dynamic bus sizing.

FIG. 3 is a block diagram of the proposed interconnection between the 80386, the 82385 cache controller, the latched buffer 240 forming the interface between the CPU local bus and the system bus, as recommended by the manufacturer. More particularly, FIG. 3 shows the address and control bus components of the CPU local bus CPULBA (including address conductors A2-A31 and the control conductors D/C, W/R and M/IO) are coupled to an input of the controlled Address Latch (AL) representing an element of buffer 240. An output of the latch AL is to the address component of the system bus SBA. Likewise, the data input/output terminal of the 80386 (comprising conductors D0-D31) is connected to one terminal of the Data Latch (DL) between the CPU local bus and the system bus representing another element of buffer 240. The other terminal of DL is the data component of the system bus SBD. FIG. 3 shows that the 82385 cache controller provides a READYO signal to the 80386 via external logic represented by the AND gate 300 and the OR gate 301. READYI is the ready signal which indicates either that the bus cycle is completed or is asserted prior to completion of the system bus cycle on a posted write operation. Since DL is bidirectional, it can latch data either from the CPU local bus component (D0-D31) or from the in system bus data component (SBD), the 82385 also provides a direction signal (BT/R) to indicate whether the DL transfers data from the CPU local bus or the system bus. The signals BE0-BE3 (both those output by the 80386 and the repeated signals output by the 82385) are additional, addressing signals. The 80386/82385 microcomputer system is arranged to, on each main memory access, to access a "line" of data representing four bytes. The 4-bit addressing signals (BE0-BE3) may be used to select one or more bytes from the four bytes in the "line". The signals BHOLD and BHLDA are a bus hold, bus hold acknowledge pair running between the 82385 cache controller and the arbitration supervisor 335. BADS is a signal indicating that the addressing element of the system bus SBA is asserting a valid address. BREADY is a ready signal from the system bus 250 to the 82385.

As shown in FIG. 3 and as explained in the referenced Intel manuals, all writes are posted, i.e. address and data is latched into the elements DL and AL of the buffer 240, and the 82385 then asserts READYO, enabling the 80386 to initiate a subsequent operation. The posted write can then be completed from the data in the AL and DL, as supervised by the 82385. So long as devices to which the posted write is directed are 32-bit devices, so that the write operation can be completed in a single cycle, or so long as the posted write is a 16-bit write to a 16-bit device, etc., posted writes are effective. On the other hand, to the extent that a posted write cycle encompasses data exceeding the size of the device to which the write is posted, then the posted write is inappropriate. The reason it is inappropriate is that in all such cases additional cycles are necessary (a 32-bit cycle to a 16-bit device requires two cycles, etc.). However, by the time the 80386 receives a BS16 signal indicating (for a 32-bit cycle) that the posted write is to a 16-bit device, it is already into the subsequent operation and cannot repeat the earlier cycle.

The Intel-recommended signals for the address latch AL are BACP and BAOE#. The address latch signals can be used with the present invention. The Intel-recommended signals for the data latch DL are BT/R, DOE# and LDSTB. These are recommended for type 74646 chips. Of the foregoing signals, BT/R defines the direction of data transmission either toward the system bus or toward the CPU local bus, while DOE is the output enable signal. These two signals therefore define not only an output enable condition, but which output (system bus or CPU local bus) is to be enabled. The latching action occurs, after DOE and BT/R become appropriate and timed with the strobe LDSTB.

In an embodiment of the present invention which has actually been constructed, the type 74646 latches have been replaced with type 74543. The latter latches do not use BT/R and/or DOE signals. Rather, latch type 74543 uses OEAB or OEBA to both enable the output and define whether the output is to the system bus (OEAB) or to the CPU local bus (OEBA). The present invention does away with LDSTB and instead generates LEAB when posted writes are appropriate. It should be apparent therefore that the present invention can be implemented using the type 74543 latches (with the signals OEAB, OEBA and LEAB) or with the type 74646 latches (using the signals BT/R, DOE and a strobe signal developed from LEAB). In the event the type 74543 latches are employed, the control element C can use, among other inputs, BT/R and DOE from the 82385 in order to generate OEAB and OEBA.

Figure 4:
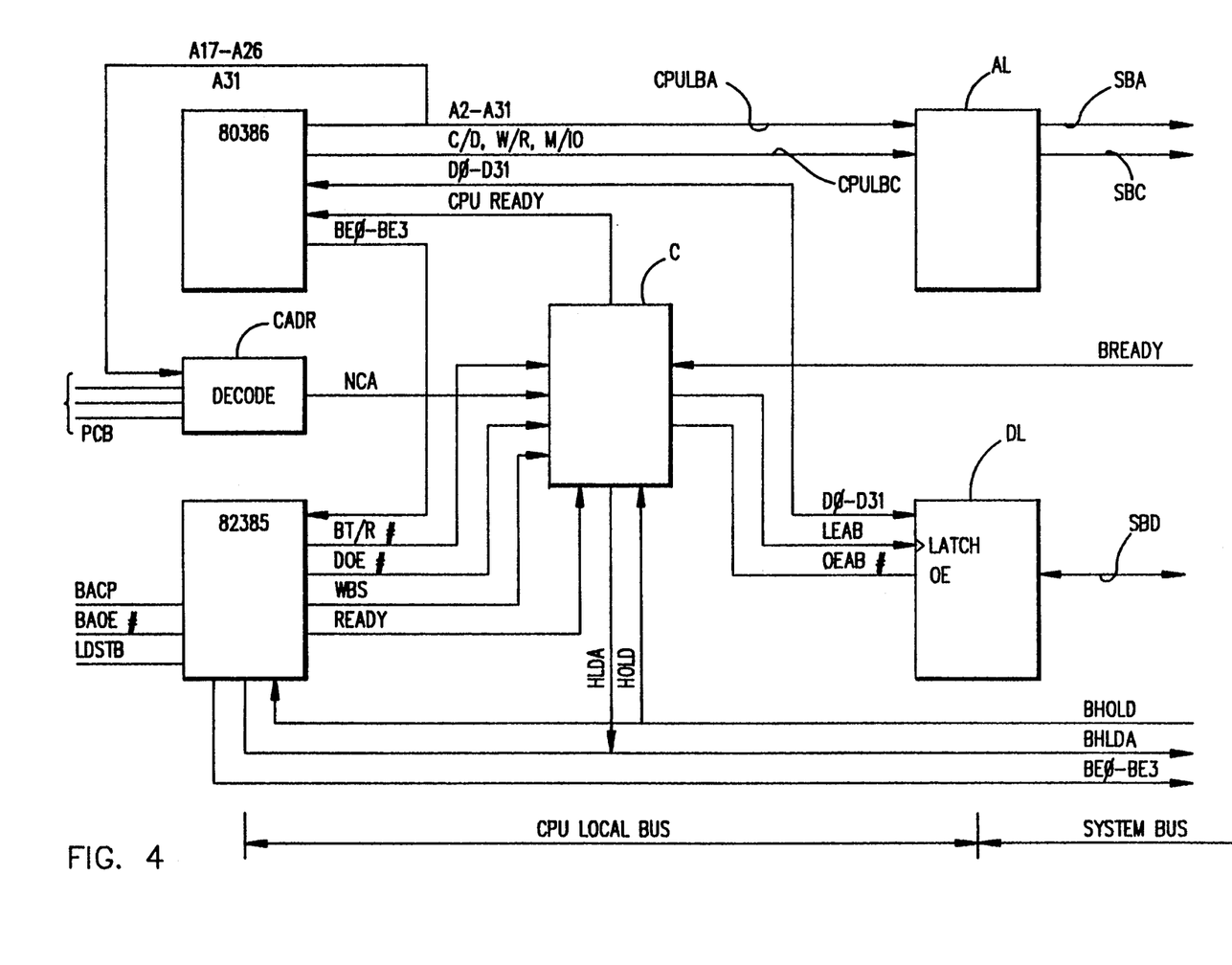
FIG. 4 is a block diagram, similar to FIG. 3, but illustrating application of the present invention for selectively posting write cycles.

FIG. 4 is similar to FIG. 3 but shows how the 80386, 82385, AL, DL, the CPU local bus 230 and the system bus 250 are interconnected in accordance with the present invention and in an embodiment using the 74543 latch DL. The BT/R output of the 82385, instead of being coupled to the DL, is now input to a new control element C. Other inputs to the control element C include the DOE# signal and the WBS signal from the 82385 and the READYO (which previously had been connected to the 80386—see FIG. 3). A decoder CADR is coupled to the CPU local bus address component (CPULBA), and more particularly tag bits A1-7-A26 and A31. The CADR asserts a signal NCA which is input to the control element C indicating an asserted address on the CPULBA which is an address to a non-cacheable device. Likewise, control signals for the element DL, specifically LEAB (to latch data into the element DL) and OEAB# and OEBA (to enable the output of the DL element) also originate in the control element C. A further input to the control element C is the signal BREADY, generated by the system bus.

The decoder CADR receives, in addition to its inputs from bits A17-A26 and A31 of the CPULBA, Programmable Cacheability Bits (PCB). In an embodiment actually constructed, the first of these three bits represents a decision to allow caching ROM space. A second bit either enables the decoder CADR to output NCA based on the decoded information, or alternatively, to declare all accesses non-cacheable, i.e. assert NCA regardless of the asserted address on the CPULBA. Finally, a third bit indicates, in one state, that address space between 0 and 8 megabytes is cacheable and that address space between 8 to 16 megabytes is non-cacheable. In the other state, the bit indicates that address space in the range 0 to 16 megabytes is all cacheable. If desired, the effect of this bit can be multiplied by simply reflecting the status of the first 16 megabytes through the succeeding 16 megabyte ranges. Of course, the use of these particular cacheability indicators (or others) is not essential to the invention. It is, however, important to arrange the CADR so that it can quickly decode its inputs and produce NCA. In an embodiment actually constructed, the timing window for production of NCA, from valid addresses on the CPULBA, was very short, on the order of ten nanoseconds.

The term CPUREADY is defined below (see Equation 7). The fifth line of the equation (on the right side of the equals sign) indicates the dependence of CPUREADY on NCA, i.e. when NCA is asserted along with READYO, CPUREADY is negated.

Concurrent with CPUREADY being asserted, LEAB must be asserted to latch the data to be written in DL. The signal LEAB is defined in Equation 8 (below). It includes a set term (on the first line, on the right side of the equals sign) and two hold terms on the second and third lines. The set term requires the conjunction of /BUSCYC386, /CPUREADY, (W/R), CLK and ADS.

In an embodiment of the invention actually constructed, the control logic C (as well as other control logic not illustrated which implemented other of the Equations 1-11, shown below) was implemented in the form of Programmable Array Logic. It should be apparent to those skilled in the art that other conventional logic implementations are also available.

Accordingly, by using the external logic shown in FIG. 4 (and explained below in connection with the logic equations), posted writes are only available for cacheable accesses. By definition a cacheable access is a 32-bit device, although there may well be other 32-bit devices which are non-cacheable. The major decision required to implement this invention is to decide whether a posted write is appropriate. Once that decision is made, it is implemented by developing the appropriate control signals to DL and AL. The signals created by the 82385 are appropriate to the extent compatible with the decision to post the write.

Accordingly, use of the invention allows posted operations to proceed notwithstanding the fact that devices smaller than 32 bits may well be coupled on the system bus and/or the optional feature bus.

The logic equations which have been referenced above are reproduced immediately below. In this material the symbols have the following meanings associated with them:

| Symbol | Definition |
| --- | --- |
| / | Negation |
| := | A registered term, equal to |
| = | A combinatorial term, equal to |
| & | Logical AND |
| + | Logical OR |

| Logic Equations | |
| --- | --- |
| /BREADY385=/BUSCYC385 & /BREADY & MISS1 | (1) |
| /BT2:=BUSCYC385 & PIPECYC385 & /BADS & CLK & BT2<br>+ BUSCYC385 & /PIPECYC385 & BADS & CLK & NACACHE & BT2<br>+ MISS1 & /BUSCYC385 & /BADS & /(BW/R) & CLK & NCA & /BREADY<br>+ /MISS1 & /BREADY & /BUSCYC385 & CLK<br>+ /BT2 & BREADY & NACACHE<br>+ /CLK & /BT2 | (2) |
| /BUFWREND:=WBS & /BUSCYC385 & /BREADY & CLK | (3) |
| /BUSCYC385:=BUSCYC385 & /BADS & CLK<br>+ BUSCYC385 & /PIPECYC385 & CLK<br>+ BUSCYC385 & /BT2 & CLK<br>+ /BUSCYC385 & BREADY<br>+ /BUSCYC385 & /CLK | (4) |
| /BUSCYC386:=BUSCYC386 & /ADS & CLK & /RESET<br>+ BUSCYC386 & /PIPECYC386 & CLK & /RESET<br>+ /BUSCYC386 & CPUREADY & /RESET<br>+ /BUSCYC386 & /CLK & /RESET | (5) |
| /CPUNA:=/MISS1 & CLK & CPUNA & /NACACHE<br>+ /MISS1 & CLK & CPUNA & /BREADY & /BUSCYC385<br>+ /CPUNA & /CLK<br>+ /CPUNA & /MISS1 & CLK<br>+ /CPUNA & CLK & BREADY<br>+ /CPUNA & BUSCYC385 & NACACHE & CLK | (6) |
| /CPUREADY=/READYO & /(W/R)<br>+ /BRDYEN & /BREADY & MISS1 & /BUSCYC385<br>+ /READYO387<br>+ /BREADY385 & (W/R) & /LEAB<br>+ /READYO & (W/R) & NCA<br>+ /RDY387PAL | (7) |
| LEAB:=/LEAB & /BUSCYC386 & CPUREADY & (W/R) & CLK & ADS<br>+ LEAB & BUFWREND & /CLK<br>+ LEAB & WBS & CLK | (8) |
| /MISS1:=MISS1 & BUSCYC385 & CPUNA & /BADS & /(BW/R) & CLK & NCA | (9) |

```
     -continued
+ MISS1 & BUSCYC385 & /BADS & /(BW/R) & CLK & NCA & /BREADY
+ /MISS1 & /CLK
+ /MISS1 & BREADY
/PIPECYC385:=PIPECYC385 & /BADS & /BUSCYC385 & CLK & /BREADY         (10)
+ PIPECYC385 & /MISS1 & BT2 & /BUSCYC385 & CLK & /BREADY
+ /PIPECYC385 & /CLK
/PIPECYC386:=                                                        (11)
PIPECYC386 & /ADS & CLK & /CPUREADY & /RESET & /BUSCYC386
+ /PIPECYC386 & /CLK & /RESET
/OEAB = (BT/R) & /DOE                                                (12)
/OEBA = /BUSRD                                                       (13)
/BUSRD := BUSRD & BUSYCYC385 & /BADS & /(BW/R) & CLK                 (14)
    + BUSRD & PIPECYC385 & /(BW/R) & CLK
    + /BUSRD & BREADY
    + /BUSRD & MISS1
    + /BUSRD & /CLK
```

In the foregoing logic equations the following signals are described or referred to in the cited Intel publications:

ADS
BADS
BRDYEN
BREADY
(BT/R) actually referred to as BT/R, the parentheses are used to indicate that the entire term is one signal
(BW/R) actually referred to as BW/R, the parenthesis are used to indicate that the entire term is one signal
CLK
DOE
READYO
RESET
WBS
(W/R) actually referred to as W/R, the parenthesis are used to indicate the entire term is one signal ADS, when active indicates a valid address on the CPU local bus 230. BADS, when active indicates a valid address on the system bus 250. BRDYEN is an output of the 82385 which is a antecedent of the READY signals. (BT/R) defines bus transmit or receive. BREADY is a ready signal from the system bus 250 to the CPU local bus 230. BW/R defines a system bus 250 Write or Read. CLK is a processor clocking signal which is in phase with the processor 225. READYO is another output of in the 82385 in the line of ready signals. RESET should be apparent. WBS indicates the condition of the Write Buffer. (W/R) is the conventional Write or Read signal for the CPU local bus 230.

Equations (1)–(14) define:
BREADY385
BT2
BUFWREND
BUSCYC385
BUSCYC386
BUSRD
CPUNA
LEAB
MISS1
PIPECYC385
PIPECYC386
CPUREADY
OEAB
OEBA in terms of the defined signals, the signals described or referred to in the cited Intel publications and NCA, NACACHE, READYO387 and RDY387PAL.

BREADY385 is a signal like BREADY which in an embodiment actually constructed was modified to accommodate a 64K cache. In the case of a 32K cache (as recommended by the manufacturer) BREADY can be used in lieu of BREADY385.

BT2 reflects the state of the system bus 250. The state BT2 is a state defined in the cited Intel publications.

BUFWREND represents the end of a buffered write cycle.

BUSCYC385 also reflects the state of the system bus 250. It is high for bus states BTI, BT1, BT1P and low for bus states BT2, BT2P and BT2I (again these are bus states referenced in the cited Intel publications).

BUSCYC386 is high during CPU local bus 230 states TI, T1, T1P, T2I and low during T2. It is also low for T2P unless T2I occurs first.

CPUNA is a signal to the 80386 allowing pipelined operation.

LEAB is the latch enable (into buffer 240) for posted writes.

OEAB is latch enable to the system bus.

OEBA is latch enable to the 80386.

MISS1 is active defining the first cycle in a double cycle for handling 64 bit reads to cacheable devices.

PIPECYC385 is active during BT1P (which is a bus state referred to in the cited Intel publications.

PIPECYC386 is low during state T1P of the CPU local bus 230.

CPUREADY is the ready input to the 80386.

NCA is a signal created by decoding the address component on the CPU local bus 230 to reflect, when active, a non-cacheable access. Cacheability is determined by a tag component (A31 to A17) and programmable information defining what tags (if any) refer to cacheable as opposed to non-cacheable addresses.

NACACHE is a signal similar to the BNA signal. BNA is a system generated signal requesting a next address from the CPU local bus 230, and is referenced in the cited Intel publications. NACACHE differs from BNA only in respect of the fact that BNA is created for 32K cache while NACACHE is created for a 64K cache. So long as the cache memory is 32K, as cited in the Intel publications the NACACHE signal referred to here could be replaced by the BNA signal.

READYO387 is the ready output of the 80387 math coprocessor.

RDY387PAL is an output of external logic used in the event a 80387 math coprocessor is not installed to prevent the absence of the math coprocessor from interfering in system operations.

Accordingly, it should be apparent that the present invention has overcome any potential incompatibility between dynamic bus sizing and posted write operations. More particularly, this incompatibility is overcome by detecting whether the address asserted on the CPU local bus 230 is or is not within a range of addresses identified as cacheable. Posted write operations are allowed only to cacheable devices. CPUREADY is generated to allow the CPU to proceed to a next operation. It may or may not be generated prior to completion of a pending operation. Referring to Equation 7, the term defined in line 1 relates to a read hit. This operation interacts with cache and is a zero wait state operation so CPUREADY is active. Line 2 relates to cache read misses. CPUREADY only becomes active with BREADY active, i.e. the cycle is not posted. Line 4 relates to non-posted write, e.g. CPUREADY is active only with BREADY385 (similar to BREADY). Line 5 relates to a cacheable (NCA inactive) write and so this is a posted operation, i.e. CPUREADY is active without BREADY or BREADY385.

In an embodiment of the invention actually constructed, the additional logic referred to is implemented in the form of a programmable logic array in accordance with the logic equations shown herein. However, after reviewing this description it should be apparent that the logic equations described herein need not be implemented as programmable array logic, but could be implemented in other logic forms. Furthermore, application of the invention does not require use of the specific logic equations presented herein. Thus the invention should not be construed in accordance with the specific example described herein, but rather should be construed in accordance with the claims attached hereto.

I claim:

1. A microcomputer system comprising:
   a central processor unit (CPU) including means for executing instructions, said instructions including write operations directed to storage devices, and for generating address, data, and control information at initiation of said write operations;
   a cache subsystem having an assigned range of addresses and including means for generating a first ready signal during each write operation;
   said address information generated by the CPU during each of said write operations corresponding to a storage device to which the write operation is directed and each said address information being within or outside of said assigned range of addresses;
   a CPU local bus connecting said CPU and cache subsystem;
   buffer means, coupling the CPU local bus to a system bus, for routing processor-to-storage device data transfers during said write operations;
   address decoder means connected to the CPU local bus and responsive to address information generated by the CPU at the initiation of write operations for determining whether the address information is within or outside of said assigned range of addresses;
   logic means coupled to and controlled by said address decoder means at the initiation of a write operation for coupling said first ready signal to the CPU to initiate a next instruction and for posting the write operation to the buffer means when said generated address information lies within said assigned range of address; and
   said logic means controlled by said address decoder means at the initiation of a write operation when said generated address information lies outside said assigned range of addresses for preventing the coupling of said first ready signal to the CPU and for preventing posting of the write operation.

2. The microcomputer system of claim 1:
   wherein said CPU and said cache subsystem have a predetermined data width; and
   wherein the address information generated at the initiation of a write operation lies within said assigned range of addresses when the storage device to which the operation is directed has a data width equal to said predetermined data width; and
   wherein the address information generated at the initiation of a write of operation lies outside of said assigned range of addresses when the storage device to which the write operation is directed has a data width less than said predetermined data width.

3. A microcomputer system comprising:
   a microprocessor for executing write instructions and carrying out write operations directed to functional units, said microprocessor comprising a predetermined microprocessor data width and means for generating, at the initiation of each write operation, a functional unit address corresponding to a functional unit to which said write operation is directed;
   each functional unit address being within a first or second range of addresses respectively when its corresponding functional unit has a data bus width equal to or not equal to said microprocessor data bus width;
   a cache memory coupled to said microprocessor by a local bus;
   a main system bus coupled to said local bus by a buffer;
   address responsive means coupled to the local bus and responsive to said generated addresses at the initiation of each write operation for determining whether an address generated by the microprocessor is in the first or second range of addresses; and
   posting means coupled to said address responsive means and to said buffer and responsive to said determined address being in said first range of addresses for selectively posting to said buffer those write operations which are directed to a functional unit exhibiting a functional unit data bus width equal to the microprocessor data bus width to be completed by means other than the microprocessor, said posting means not posting an operation to said buffer when said determined address is in said second range of addresses.

4. The microcomputer system of claim 3 wherein said cache memory is assigned a range of addresses equal to said first range of addresses.

5. Data processing apparatus comprising:
   a microprocessor for executing a write instruction including a write operation directed to a storage device;
   said microprocessor generating, at the initiation of said write operation, an address corresponding to said storage device;
   a cache subsystem having an assigned range of addresses;
   a local bus coupling the microprocessor to the cache subsystem;
   a system bus coupled to said local bus by a buffer;

an address decoder coupled to said local bus and responsive to said address at the initiation of said write operation for determining whether said address is within or outside of said assigned range of addresses;

logic means coupled to and controlled by said address decoder at the initiation of said write operation for causing the microprocessor to initiate a next instruction and for posting said write operation to the buffer to be completed by means other than the microprocessor when said address lies within said assigned range of addresses; and said logic means controlled by said address decoder at the initiation of said write operation when said address lies outside of said assigned range of addresses for preventing initiation of a next instruction and for preventing posting of said write operation.

6. The data processing apparatus of claim 5 wherein write operations are directed to each of a plurality of storage devices, and wherein each of said addresses corresponding to a respective storage device lies within or outside of said assigned range of addresses depending respectively upon whether the corresponding storage device has a data bus width equal to or not equal to a data bus width of said microprocessor.

7. A microprocessor system comprising:

a central processor unit (CPU) for executing write instructions including data transfers directed to functional units;

a cache subsystem and a local bus interconnecting said CPU and said cache subsystem;

a system bus for routing said data transfers between the CPU and said functional units;

a buffer coupling the system bus to the local bus;

an address decoder responsive to an address placed on the local bus by the CPU at the initiation of each said data transfer to determine whether or not the address falls within an address range of the cache subsystem; and logic means responsive to the address decoder at the initiation of a data transfer for controlling operation of the CPU by allowing it to proceed to a next CPU operation and for posting to said buffer the data transfer for completion by means other than the CPU when the decoded address is within said address range, and alternatively stopping the CPU from proceeding to the next CPU operation and preventing posting of the data transfer when the decoded address is outside said address range.

* * * * *